United States Patent
John et al.

(10) Patent No.: US 9,633,147 B1
(45) Date of Patent: Apr. 25, 2017

(54) POWER STATE COVERAGE METRIC AND METHOD FOR ESTIMATING THE SAME

(71) Applicant: TAIWAN SEMICONDUCTOR MANUFACTURING COMPANY LTD., Hsinchu (TW)

(72) Inventors: Stanley John, Fremont, CA (US); Sandeep Kumar Goel, Dublin, CA (US); Tze-Chiang Huang, San Jose, CA (US); Yun-Han Lee, Hsinchu County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 14/874,881

(22) Filed: Oct. 5, 2015

(51) Int. Cl.
  *G06F 17/50* (2006.01)
(52) U.S. Cl.
  CPC ...... *G06F 17/5022* (2013.01); *G06F 17/5045* (2013.01)
(58) Field of Classification Search
  CPC .................. G06F 17/5022; G06F 2217/78
  USPC ....................................................... 716/109
  See application file for complete search history.

(56) References Cited

U.S. PATENT DOCUMENTS

| | | | |
|---|---|---|---|
| 8,510,694 B2* | 8/2013 | Hsieh et al. | G06F 17/5022 703/16 |
| 8,781,808 B2* | 7/2014 | Yang | G06F 17/5022 703/13 |
| 2013/0212546 A1* | 8/2013 | Chen et al. | G06F 17/5045 716/109 |

OTHER PUBLICATIONS

Hsieh et al.,"PAC Du System Power Estimation at ESL", 2010, IEEE, Proceedings of he 2010 Asia and South Pacific Design Automation Conference (ASPDAC), pp. 815-820.*
Schurmans et al.,"Creation of ESL Power Models for Communication Architectures using Automatic Calibration", May 2013, DAC, Proceedings of the 5th Annual Design Automation Conference, Article No. 56, 6 pages.*

* cited by examiner

*Primary Examiner* — Sun Lin
(74) *Attorney, Agent, or Firm* — WPAT, P.C., Intellectual Property Attorneys; Anthony King (57) ABSTRACT

In some embodiments, in a method performed by at least one processor for estimating an overall power state coverage of an electronic system level (ESL) model comprising a plurality of blocks for a module, a first value and a second value are set for each block of said plurality of blocks. At least one verification case is selected for each block in the ESL model. For each verification case of said at least one verification case: (a) a target coverage value is set, (b) a register transfer level (RTL) simulation is performed, (c) an actual coverage value is received, and (d) the first value or the second value is updated based on whether the actual coverage value is less than the target coverage value or not. A power state coverage is calculated for said each block. The overall power state coverage is calculated for the ESL model comprising said plurality of blocks for said module.

20 Claims, 8 Drawing Sheets

Verification Cases for Video Encoder Module (Original) — 701

| Block | Power States | Power Verification Cases |
|---|---|---|
| Video Compression | H264 State | H264_I_Frame Test (CTT=30%)<br>H264_B_Frame Test (CTT=30%)<br>H264_P_Frame Test (CTT=40%) |
| MPEG Encoder | MPEG4 State | MPEG4_I_Frame Test (CTT=25%)<br>MPEG4_P_Frame Test (CTT=25%) |
| | MPEG2 State | MPEG2_I_Frame Test (CTT=15%)<br>MPEG2_P_Frame Test (CTT=15%) |
| | MPEG1 State | MPEG1 Test (CTT=20%) |
| JPEG Encoder | JPEG State | JPEG Test (CTT=90%) |
| CTRL block | IDLE state | IDLE Test (CTT=90%) |

Verification Cases for Video Encoder Module (After Simulation and Analysis) — 702

| Block | Power States | Power Verification Cases | |
|---|---|---|---|
| Video Compression | H264 State | H264_I_Frame Test (CTT=30%)<br>H264_B_Frame Test (CTT=30%)<br>H264_P_Frame Test (CTT=40%) | |
| | H263 State | H263_I_Frame Test<br>H263_P_Frame Test | Added — 703 |
| MPEG Encoder | MPEG4 State | MPEG4_I_Frame Test (CTT=25%)<br>MPEG4_P_Frame Test (CTT=25%) | |
| | MPEG2 State | MPEG2_I_Frame Test (CTT=15%)<br>MPEG2_P_Frame Test (CTT=15%) | |
| | MPEG1 State | MPEG1 Test (CTT=20%) | Removed — 704 |
| JPEG Encoder | JPEG State | JPEG Test (CTT=90%) | |
| CTRL block | IDLE state | IDLE Test (CTT=90%) | |

POWER STATE COVERAGE METRIC AND METHOD FOR ESTIMATING THE SAME

BACKGROUND

As semiconductor chip performance increases, the chip design becomes increasingly complex. The traditional register transfer level (RTL) design methodology is time-consuming for the modern system-on-chip (SoC) design which needs a high integration of software and hardware. It may be too late to revise design if problems are detected in the RTL stage. Therefore, the electronic system level (ESL) design methodology is adopted to facilitate modern system design.

Power consumption has been an important issue in chip design. For the ESL model, power estimation is required for system-level design and technology exploration because an ESL model contains power states and associated power consumption number for each intellectual property (IP) in the ESL model.

BRIEF DESCRIPTION OF THE DRAWINGS

The details of one or more embodiments of the disclosure are set forth in the accompanying drawings and the description below. Other features and advantages of the disclosure will be apparent from the description, drawings and claims.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

For an electronic system level (ESL) model, complete coverage of all valid power states in the ESL model may be required for accurate system-level power modeling. A missing power state may result in under-estimation of power, while power states with large functional overlap may result in over-estimation of the power. Therefore, it may be desirable to have methods to check whether the ESL model has any missing power states and whether the power states defined in the ESL model are valid power states and cover most functional parts of the chip. Methods of power state coverage verification and power consumption estimation are provided in various embodiments of the present disclosure.

Figure 1:
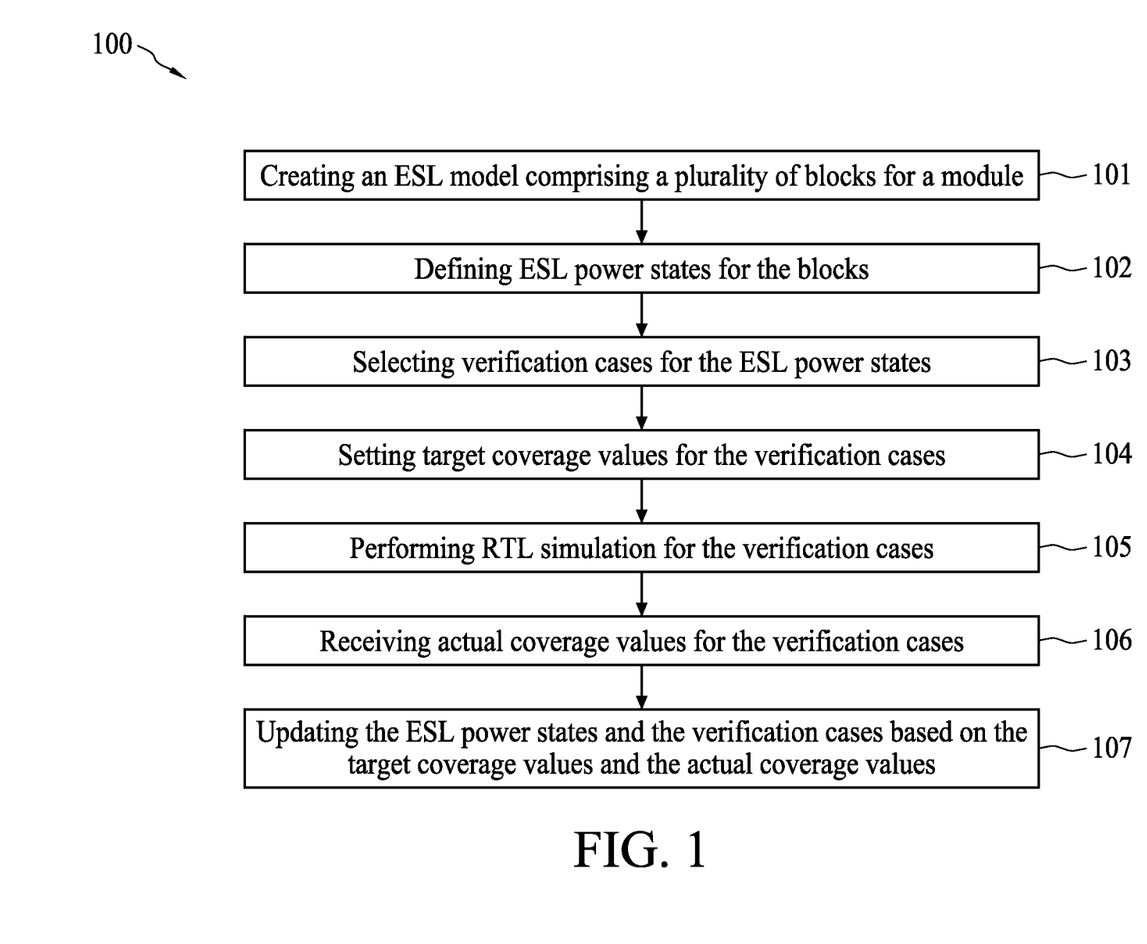
FIG. 1 is a flow diagram showing a method for managing verification cases for a module in a chip design in accordance with an embodiment.

FIG. 1 is a flow diagram showing a method 100 for managing verification cases for a module in a chip design in accordance with an embodiment. Referring to FIG. 1, in operation 101, an ESL model comprising a plurality of blocks is created for a module in a chip design. A chip design includes functional descriptions of various modules of the chip. Each module is designed to perform a specific type of function. One or more modules may be considered an engine, a core, or a processing unit. In an example, a commercially available SoC includes central processing units (CPUs), digital signal processing (DSP) cores, graphic processing units (GPUs), memory, accelerator, power modules, input/output modules and many other modules. Some or all of the modules are designed by one or more chip designers. Some modules include third-party IPs and some modules may be provided by a semiconductor manufacturer. A block may comprise a logical IP or a collection of IPs. For example, a block for a video encoder module may be MPEG encoder IPs.

In operation 102, ESL power states for each of the blocks in the ESL model are defined. In some embodiments, an ESL power state can be derived from a functional state of the block. For example, an ESL power state for an MPEG encoder block may be an MPEG4 state.

In operation 103, verification cases for each of the ESL power states are selected. The verification cases can be selected from an ESL verification cases database. For example, a verification case for the MPEG4 power state may be an MPEG4_I_Frame verification case.

In operation 104, target coverage values for each of the verification cases are set. In some embodiments, a target coverage value is an expected value of the functional code coverage covered by an ESL verification case.

In operation 105, register transfer level (RTL) simulation for each of the verification cases is performed, and actual coverage values for each of the verification cases are received in operation 106. The actual coverage value is the value of the functional code coverage actually covered by the ESL verification case as a result of the RTL simulation.

In operation 107, the ESL power states and the verification cases for each of the blocks are updated based on the target coverage values and the actual coverage values. In some embodiments, the aforementioned updating operation comprises adding or removing some verification cases for an ESL power state and/or adding or removing some ESL power states for a block. The target coverage values and the actual coverage values received after the RTL simulation can help the chip designer to understand the difference between the expected and actual coverages covered by each verification case, so the chip designer can update the ESL power states and the verification cases for each block in order to achieve better coverages for the blocks in the ESL model.

Figure 2:
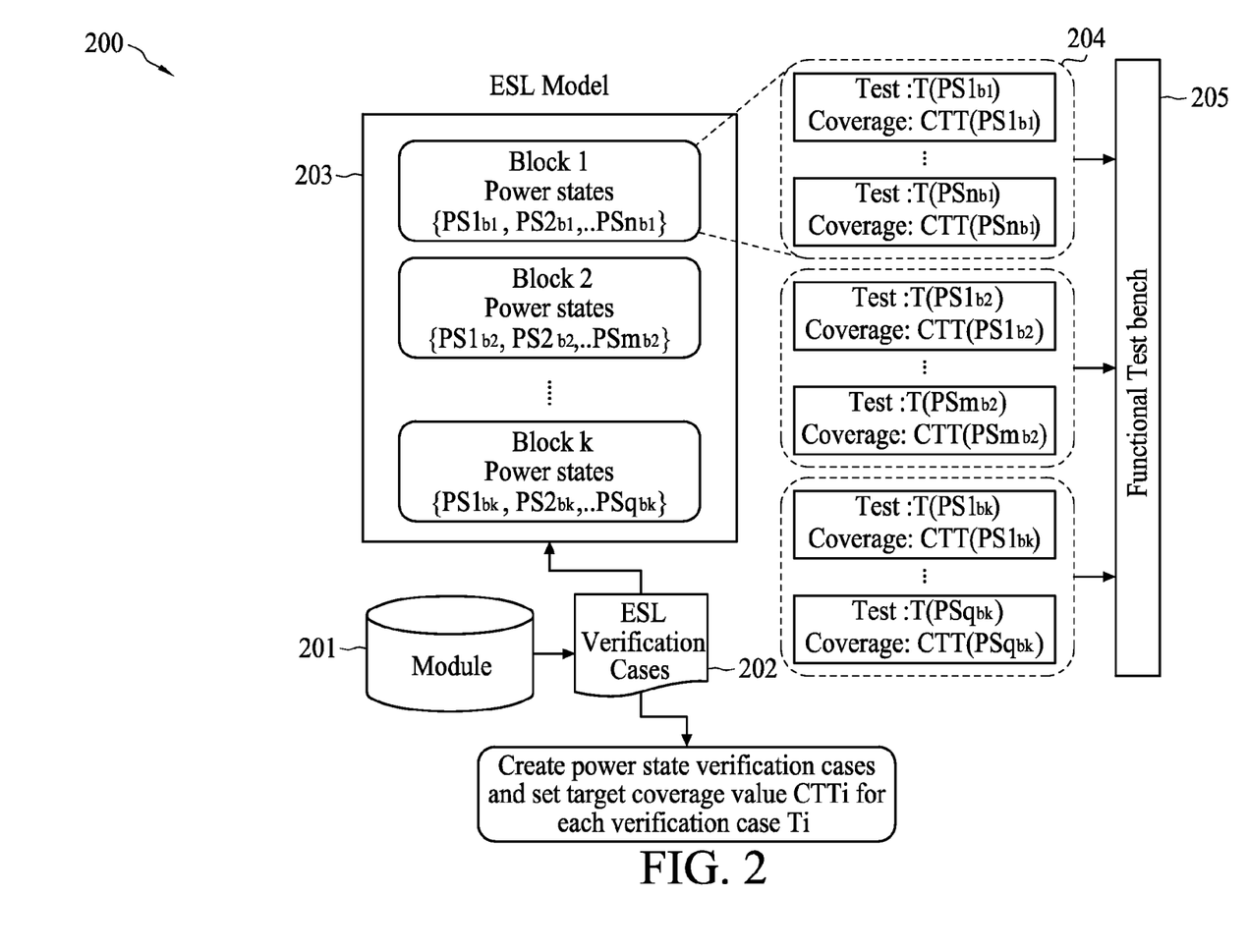
FIG. 2 is a block diagram showing a system for power state coverage estimation in accordance with an embodiment.

FIG. 2 is a block diagram showing a system 200 for power state coverage estimation in accordance with an embodiment. Referring to FIG. 2, system 200 includes a module 201, ESL verification cases 202, an ESL model 203 and a functional test bench 205. Module 201 may be a specific application comprising a set of IPs to be verified. For example, module 201 may be a video encoder application comprising a set of video encoder IPs, such as video compression IPs, MPEG encoder IPs, JPEG encoder IPs, control block IPs, and the like.

In order to verify module 201, ESL verification cases 202 are generated. ESL verification cases 202 may be selected from an ESL verification cases database. In some embodiments, ESL verification cases 202 may be generated by an automated tool. ESL verification cases 202 may also be test codes written by system architects. ESL verification cases 202 may also be a mixture of automated tool and system architect programming. In some embodiments, each verification case in ESL verification cases 202 may be used to verify the functional code coverage of a specific IP.

Based on the generated ESL verification cases 202, an ESL model 203 is created for module 201. The ESL model 203 may comprise a plurality of blocks, and each block may comprise a plurality of power states. For example, in FIG. 2, ESL model 203 may comprise Block 1 to Block k, k being a natural number. Moreover, Block 1 may comprise power states $PS1_{b1}$ to $PSn_{b1}$, Block 2 may comprise power states $PS1_{b2}$ to $PSm_{b2}$, and Block k may comprise power states $PS1_{bk}$ to $PSq_{bk}$, where n, m and q are natural numbers.

For each power state in ESL model 203, a set of verification cases in the generated ESL verification cases 202 is assigned thereto, and a target coverage value is set for each verification case assigned to said power state. For example, in element 204, $T(PS1_{b1})$ is the set of verification cases assigned to power state $PS1_{b1}$ of Block 1, and $CTT(PS1_{b1})$ is the set of target coverage values set for each verification case in $T(PS1_{b1})$. Moreover, $T(PS1_{b2})$ is the set of verification cases assigned to power state $PS1_{b2}$ of Block 2, and $CTT(PS1_{b2})$ is the set of target coverage values set for each verification case in $T(PS1_{b2})$. Similarly, $T(PS1_{bk})$ is the set of verification cases assigned to power state $PS1_{bk}$ of Block k, and $CTT(PS1_{bk})$ is the set of target coverage values set for each verification case in $T(PS1_{bk})$.

In some embodiments, the verification cases assigned to a power state may be used to verify functions corresponding to said power state. For example, a verification case assigned to the H264 power state may be a H264_I_Frame verification case that verifies H264 functions of the H264 power state. In some embodiments, the target coverage for each verification case is the expected coverage set by the chip designer.

After all verification cases and target coverages are ready, they are delivered to a functional test bench 205. A functional test bench is built to functionally verify the design by providing scenarios to check that, given certain input, the design performs to specification.

Figure 3:
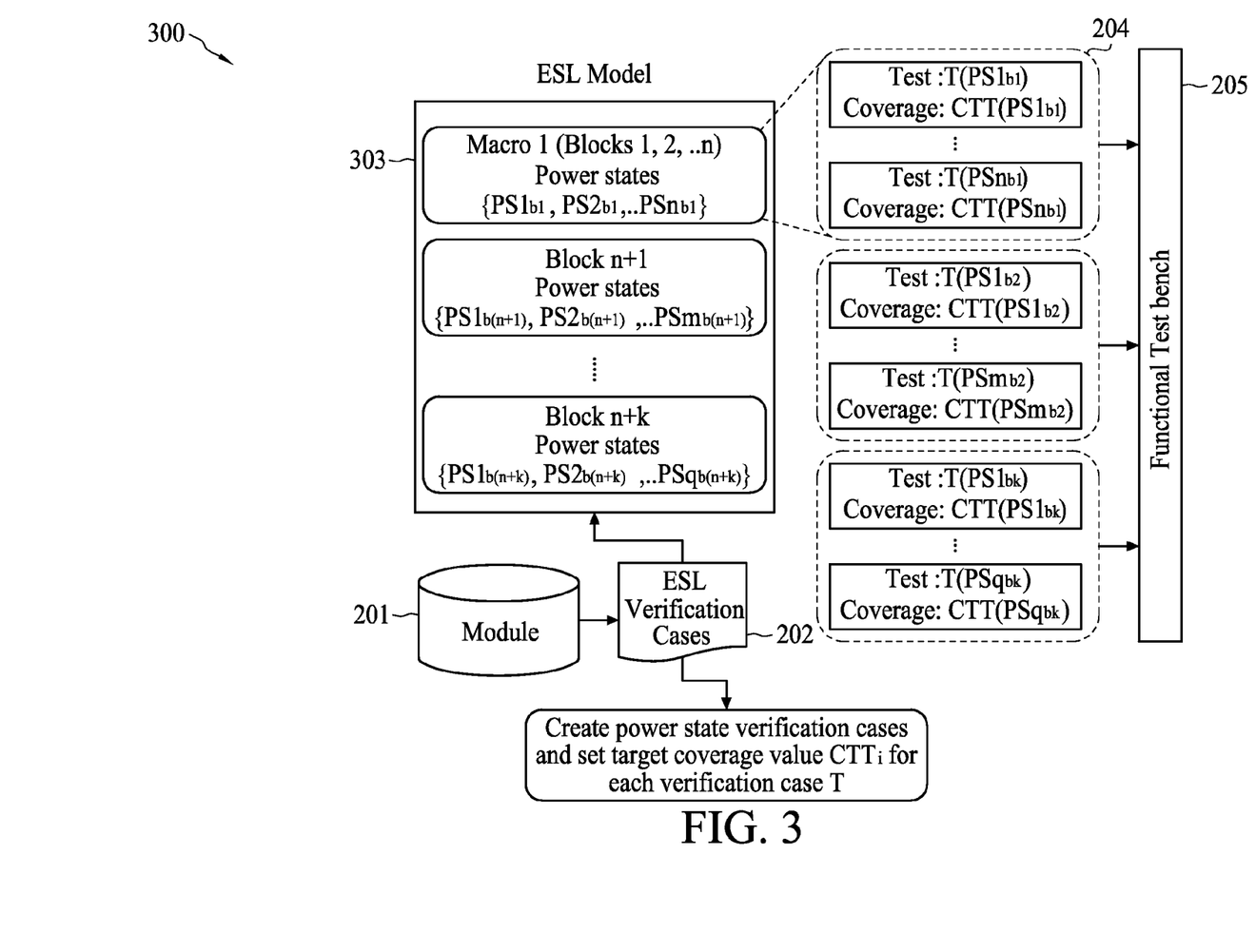
FIG. 3 is a block diagram showing a system for macro-level power state coverage estimation in accordance with an embodiment.

FIG. 3 is a block diagram showing a system 300 for macro-level power state coverage estimation in accordance with an embodiment. Referring to FIG. 3, system 300 is similar to system 200 described and illustrated in FIG. 2 except, for example, an ESL model 303. Macro 1 in ESL model 303 may contain one or more blocks and power states are given for all the blocks in Macro 1. In the present embodiment, Macro 1 comprises Blocks 1 to n and associated power states $PS1_{b1}$ to $PSn_{b1}$. ESL model 303 further comprises Block n+1 to Block n+k. Moreover, Block n+1 comprises power states $PS1_{b(n+1)}$ to $PSm_{b(n+1)}$, and Block n+k comprises power states $PS1_{b(n+k)}$ to $PSq_{b(n+k)}$.

The remaining elements of FIG. 3 are similar to the corresponding elements of FIG. 2. With the macro-level implementation, the blocks, power states, and verification cases in the ESL model can be updated and managed with more flexibility.

Figure 4:
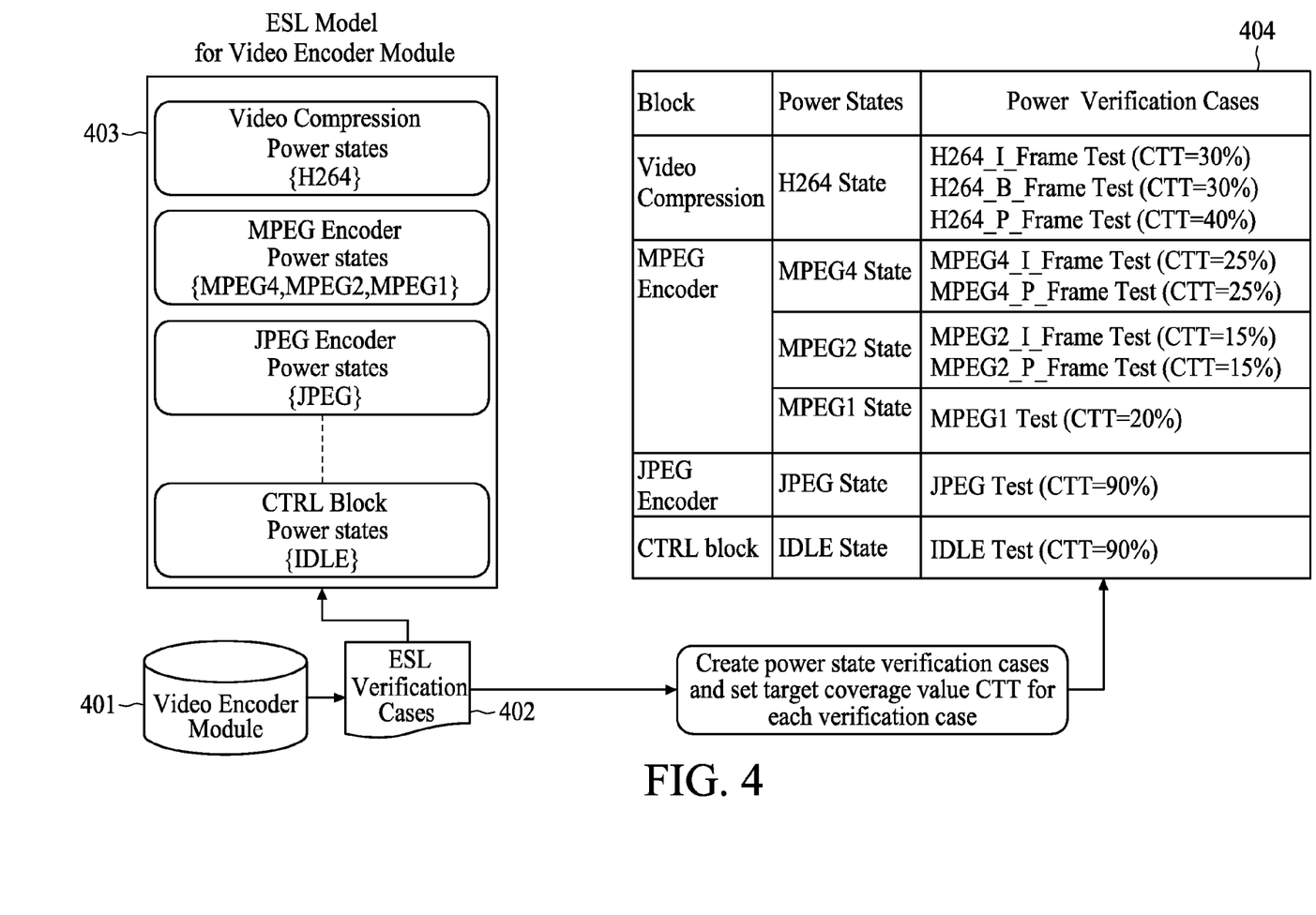
FIG. 4 is a schematic diagram of an ESL model and verification cases for a specific module in accordance with an embodiment.

FIG. 4 is a schematic diagram of an ESL model 403 and power verification cases 404 for a specific module in accordance with an embodiment. For example, if module 401 is a video encoder module, then the ESL model 403 for module 401 may comprise blocks such as video compression, MPEG encoder, JPEG encoder, control block, and the like. Table 404 shows the relationship among blocks, power states, and power verification cases of the ESL model used for verifying module 401. Each verification case may be assigned a target coverage value CTT.

In the present embodiment, the Block "video compression" comprises a power state "H264 state," where H264 refers to a video compression format. The power verification cases for the H264 state comprise an H264_I_Frame test with a CTT of 30%, an H264_B_Frame test with a CTT of 30%, and an H264_P_Frame test with a CTT of 40%.

Further, the Block "MPEG encoder" comprises power states "MPEG4 state," "MPEG2 state" and "MPEG1 state." The power verification cases for the MPEG4 state comprise an MPEG4_I_Frame test with a CTT of 25% and an MPEG4_P_Frame test with a CTT of 25%. The power verification cases for the MPEG2 state comprise an MPEG2_I_Frame test with a CTT of 15% and an MPEG2_P_Frame test with a CTT of 15%. The power verification cases for the MPEG1 state comprise an MPEG1 test with a CTT of 20%.

Moreover, the Block "JPEG encoder" comprises a power state "JPEG state" and an associated power verification case JPEG test with a CTT of 90%. Also, the Block "CTRL block" comprises a power state "IDLE state" and an associated power verification case IDLE test with a CTT of 90%.

In some embodiments, each verification case in ESL verification cases 402 may be stored in a database along with other information associated with the verification case, such as module, block, power state, target coverage value, and the like. In this way, the relationship shown in table 404 can be automatically generated.

In some embodiments, the power states and power verification cases to be used for verifying a block may be automatically determined by a set of predefined rules. In some embodiments, the blocks, power states, power verification cases, and target coverage values to be used for verifying module 401 may be decided by the chip designer.

Figure 5:
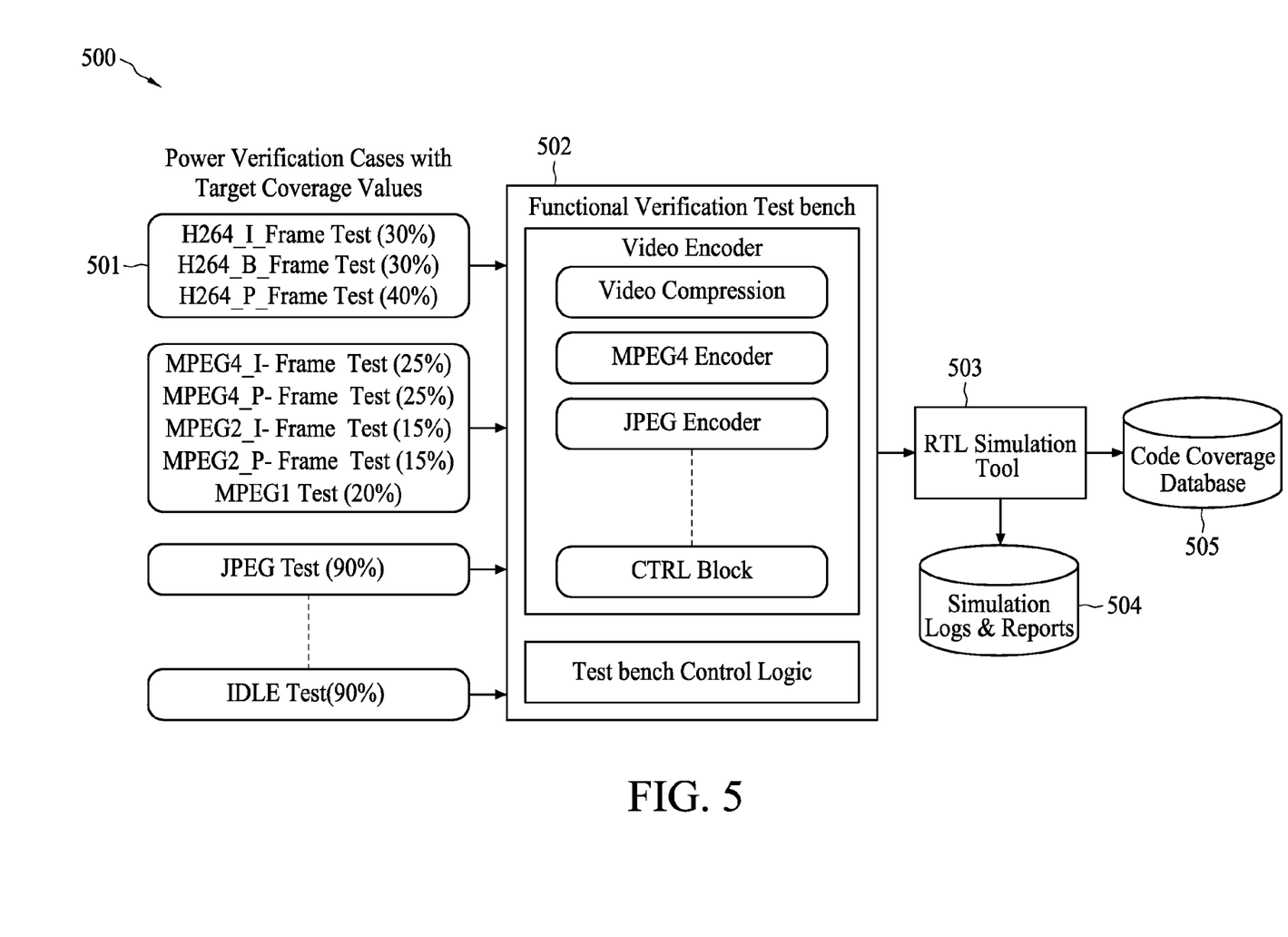
FIG. 5 is a schematic diagram of a functional verification system in accordance with an embodiment.

FIG. 5 is a schematic diagram of a functional verification system 500 in accordance with an embodiment. Referring to FIG. 5, the functional verification system 500 comprises a functional verification test bench 502, an RTL simulation tool 503, a simulation logs and reports database 504 and a code coverage database 505. In the functional verification system 500, power verification cases 501 with target coverage values, as listed in table 404 of FIG. 4, are built and become a part of the functional verification test bench 502.

The functional verification test bench 502 is used by the RTL simulation tool 503 to functionally verify the chip design. In some embodiments, the functional verification test bench 502 may include elements unrelated to the module to be verified. For example, the functional verification test bench 502 may include a test bench control logic which is unrelated to the verification cases for the video encoder module.

After RTL simulation, test results may be stored in simulation logs and reports database 504, and actual code coverage values for power verification cases 501 may be stored in code coverage database 505.

Figure 6:
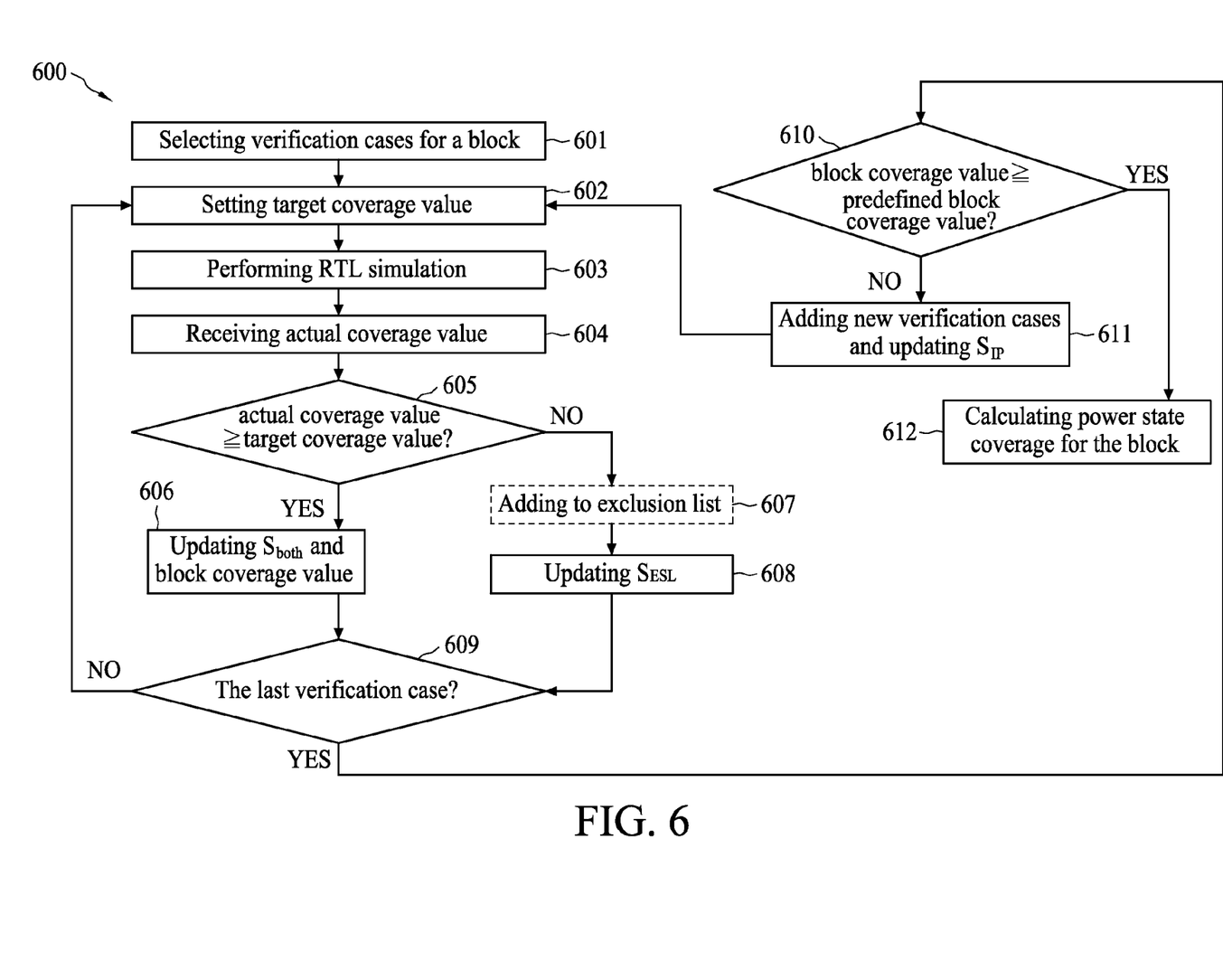
FIG. 6 is a flow diagram showing a method for estimating a power state coverage of a block in the ESL model in accordance with an embodiment.

FIG. 6 is a flow diagram showing a method for estimating a power state coverage of a block in the ESL model in accordance with an embodiment. In some embodiments, the power state coverage of a block may have direct correlation with functional code coverages of the IPs in the block. In order to calculate the power state coverage, a power state coverage metric may be defined below in Equation 1:

$$PS_{cov} = \frac{S_{both}}{S_{both} + S_{ESL} + \alpha \times S_{IP}} \quad \text{(Equation 1)}$$

In Equation 1, $PS_{cov}$ represents a power state coverage of a block in the ESL model, $S_{ESL}$ represents a "false state" that a verification case is defined in the ESL model but does not exercise the target code of the IPs in the block, $S_{IP}$ represents a "missing state" that a verification case is covered by the RTL design functional code coverage analysis but cannot be found in the ESL model, and $S_{both}$ represents a "valid state" that a verification case is defined in the ESL model and properly covered by the RTL design functional code coverage analysis.

In some embodiments, the parameter $\alpha$ in Equation 1 may be a user defined value ranging from 0 to 1. In some embodiments, the parameter $\alpha$ in Equation 1 may be defined depending on the impact factor of $S_{IP}$ when determining the power state coverage.

Referring to FIG. 6, in operation 601, at least one verification case is selected for a block. In some embodiments, the verification cases may be selected based on table 404 shown in FIG. 4. For example, the verification cases for the MPEG encoder block may include MPEG4_I_Frame, MPEG4_P_Frame, MPEG2_I_Frame, MPEG2_P_Frame, and MPEG1 verification cases. In some embodiments, a block coverage value may be initialized as 0 before calculating the power state coverage.

In operation 602, a target coverage value is set for one of the selected verification cases to be verified. In some embodiments, the target coverage value may be defined based on the CTT in table 404 shown in FIG. 4. For example, also referring to FIG. 4, for the MPEG4 state of the MPEG encoder, the target coverage value for the MPEG4_I_Frame verification case may be 25%, and the target coverage value for the MPEG4_P_Frame verification case may be 25%. In some embodiments, the target coverage value may range from 10% to 100%.

In operation 603, an RTL simulation for the verification case is performed. Next, an actual coverage value for the verification case is received in operation 604. The actual coverage value is a value of the functional code coverage actually covered by the verification case as a result of the RTL simulation.

In operation 605, it is determined whether the actual coverage value is larger than or equal to the target coverage value. If affirmative, then the $S_{both}$ and block coverage value are updated in operation 606, and then the process proceeds to operation 609. If not, then the process proceeds to operation 607, as will be discussed below.

In operation 606, the $S_{both}$ may be updated by adding a fixed or variable number thereto. In an embodiment, in operation 606 the block coverage value may be updated according to Equation 2 below:

$$Cb = Cb + CCT_j \quad \text{(Equation 2)}$$

In Equation 2, Cb represents the block coverage value, and $CCT_j$ represents the actual coverage value of the j-th verification case under verification for the block, j being a natural number. For example, Cb may be initialized as 0 before verifying the first verification case of the block. If the actual coverage value for the first verification case is 30% (i.e., $CCT_1$=30%), then Cb is updated to be 30%.

In operation 607, the verification case is added to an exclusion list if the verification case meets some criteria. In some embodiments, operation 607 is optional and the process proceeds to operation 608. In some embodiments, the verification case is added to an exclusion list if the actual coverage value of the verification case is below a threshold. If the verification case is added to the exclusion list, said verification case may not be selected as one of the verification cases for the block next time when calculating the power state coverage of said block. In some embodiments, if the verification case under verification is already listed in the exclusion list, said verification case may be excluded from further operations and the process returns to operation 602 where the next verification case for the block is to be verified. With the help of the exclusion list, verification cases have negative coverage impacts can be excluded from testing and the calculation of the power state coverage can be more accurate.

In operation 608, the $S_{ESL}$ is updated, and then the process proceeds to operation 609. In some embodiments, the $S_{ESL}$ may be updated by adding a fixed or variable number to $S_{ESL}$.

In operation 609, it is determined whether the verification case under verification is the last verification case for the block. If affirmative, then the process proceeds to operation 610. If not, then the process returns to operation 602 where the next verification case for the block is to be verified.

In operation 610, it is determined whether the block coverage value is larger than or equal to a predefined block coverage value. If not, then at least one new verification case is added for the block and the $S_{IP}$ is updated in operation 611, and then the process returns to operation 602 where the at least one new verification case is to be verified. If affirmative, then the process proceeds to operation 612. In some embodiments, the predefined block coverage value may be defined as 100%, which means that the entire design of the block should be covered with specified power states.

In operation 611, the at least one new verification case added for the block may be selected from the ESL verification cases 202 shown in FIG. 2. In operation 611, the $S_{IP}$ may be updated by adding a fixed or variable number to $S_{IP}$.

In operation 612, the power state coverage for the block is calculated. In some embodiments, said power state coverage may be calculated according to Equation 1, using the final values of the $S_{ESL}$, $S_{IP}$, and $S_{both}$.

In some embodiments, the overall power state coverage of the ESL model may be estimated based on the power state coverage of each block in said ESL model calculated by Equation 1. For example, the overall power state coverage of the ESL model may be defined below in Equation 3:

$$PS_{ALL} = \sum_{i=1}^{N} \beta_i \times PS_i \quad \text{(Equation 3)}$$

In Equation 3, $PS_{ALL}$ represents the overall power state coverage of the ESL model having N blocks, $PS_i$ represents the power state coverage of the i-th block in the ESL model, i being a natural number, and $\beta_i$ is the weight value for the i-th block and the sum of all $\beta_i$ is equal to 1. In some embodiments, $\beta_i$ may be the same for each block. In some embodiments, $\beta_i$ may be defined as a function of the number of the power states and/or the number of the verification cases of each block.

Figure 7:
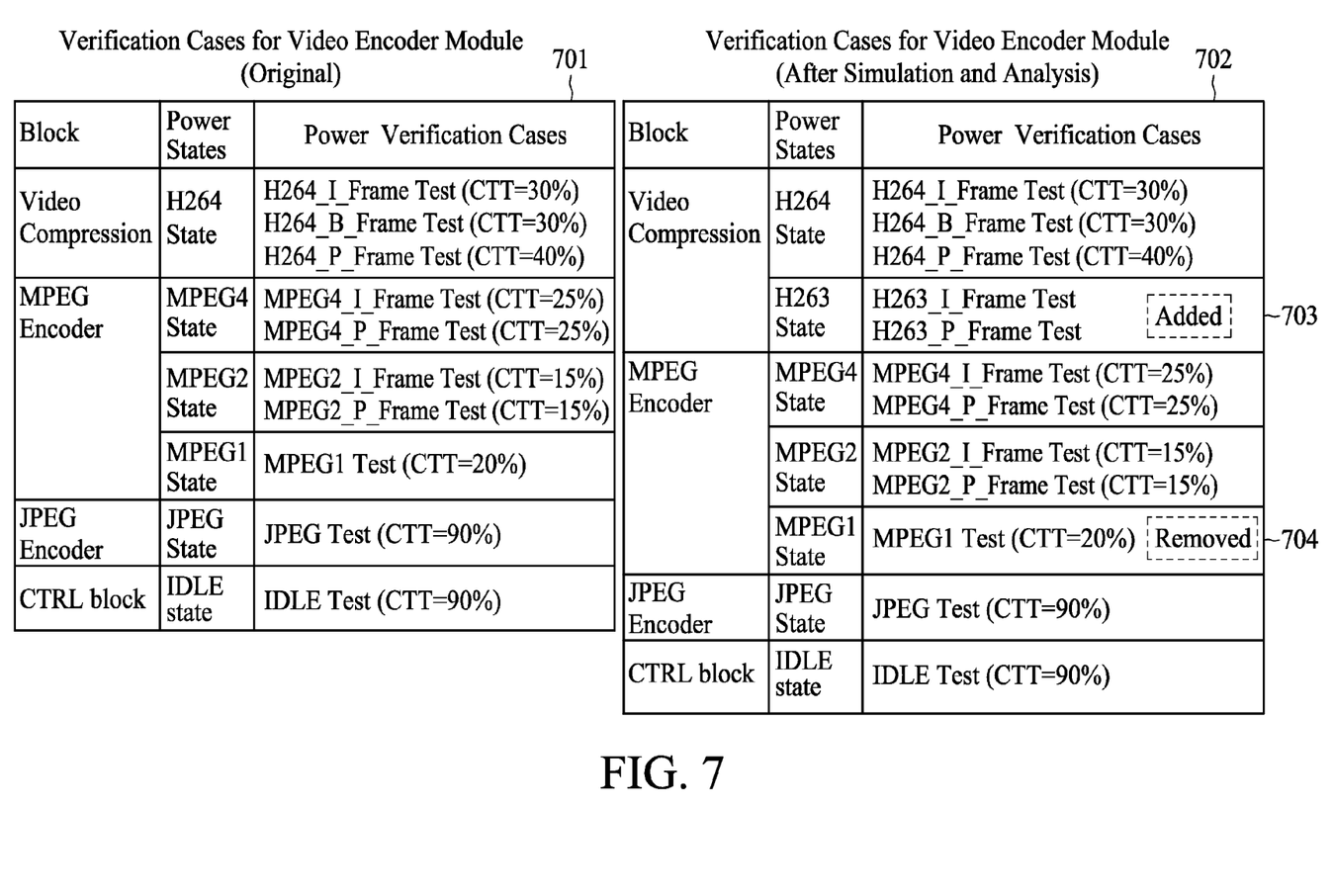
FIG. 7 is a diagram of original and updated verification cases for an ESL model in accordance with an embodiment.

FIG. 7 is a diagram of the original and updated verification cases for an ESL model in accordance with an embodiment. Referring to FIG. 7, table 701 shows the original verification cases of the ESL model used for verifying a module. The structure of the table 701 may be similar to that of the table 404 shown in FIG. 4.

Table 702 shows the updated verification cases of the ESL model used for verifying the module after performing RTL simulation for the verification cases. In some embodiments, the aforementioned updating operation comprises adding or removing some verification cases for a power state and/or adding or removing some power states for a block in the table 701.

In some embodiments, new verification cases may be added to the table 701 when the method 600 shown in FIG. 6 proceeds to operation 611. For example, item 703 in table 702 contains the added new verification cases. In some embodiments, the new verification cases added to the table 701 may be determined based on the target coverage value associated with the new verification cases. For example, if new verification cases are to be added to the video compression block in the table 701, a verification case with the highest target coverage value among the verification cases designated for the video compression block may be added to the video compression block in the table 701 first.

In some embodiments, a verification case may be removed from the table 701 when said verification case is listed in the exclusion list which may be updated in operation 607 shown in FIG. 6. For example, if the verification case in item 704 of table 702 is listed in the exclusion list, said verification case may be removed from the table 702 and may not be chosen as the verification case for the video encoder module next time when the video encoder module is to be verified. The power state associated with said verification case may also be excluded from being the power state for the video encoder module next time when the video encoder module is to be verified.

After the update of the table 701, the blocks and/or power states of the ESL model may be updated accordingly. When the same module is to be verified next time, the updated ESL model and verification cases may be used for said module. In this way, better power state coverages of the blocks and the ESL model can be achieved.

Figure 8:
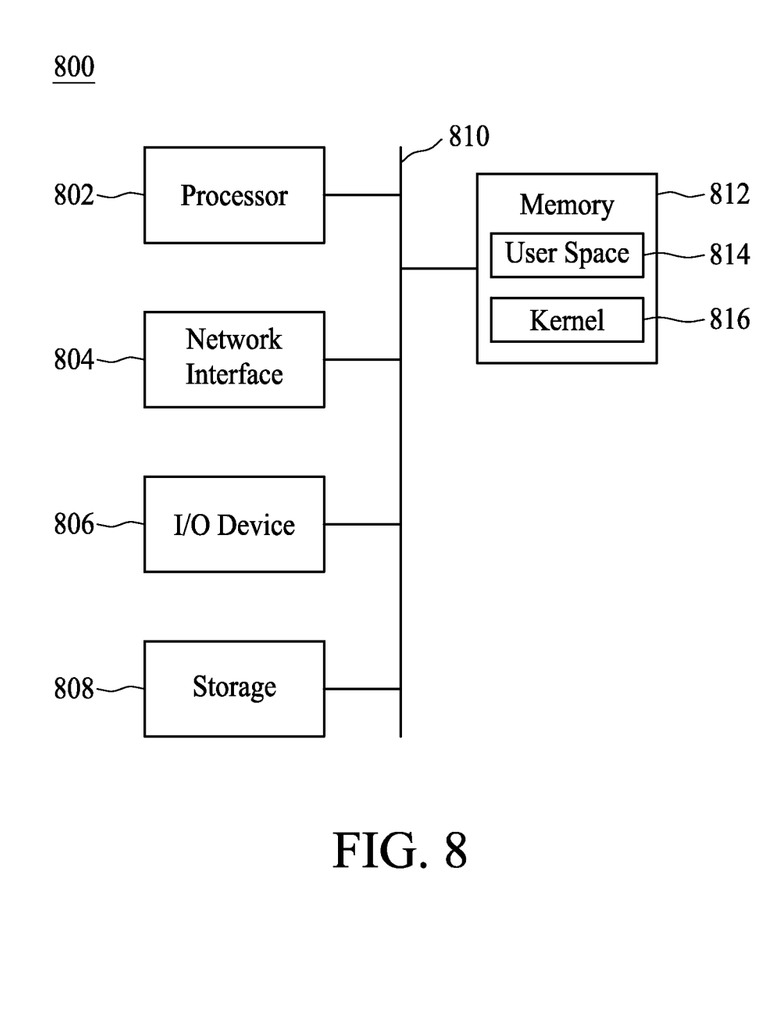
FIG. 8 is a block diagram of a hardware system for implementing the method and system embodiments described with reference to FIGS. 1 to 6 in accordance with some embodiments.

FIG. 8 is a block diagram of a hardware system 800 for implementing the method and system embodiments described with reference to FIGS. 1 to 6 in accordance with some embodiments. The system 800 includes at least one processor 802, a network interface 804, an input and output (I/O) device 806, a storage 808, a memory 812, and a bus 810. The bus 810 couples the network interface 804, the I/O device 806, the storage 808 and the memory 812 to the processor 802.

In some embodiments, the memory 812 comprises a random access memory (RAM) and/or other volatile storage device and/or read only memory (ROM) and/or other non-volatile storage device. The memory 812 includes a kernel 816 and user space 814, configured to store program instructions to be executed by the processor 802 and data accessed by the program instructions.

In some embodiments, the network interface 804 is configured to access program instructions and data accessed by the program instructions stored remotely through a network. The I/O device 806 includes an input device and an output device configured for enabling user interaction with the system 800. The input device comprises, for example, a keyboard, a mouse, etc. The output device comprises, for example, a display, a printer, etc. The storage device 808 is configured for storing program instructions and data accessed by the program instructions. The storage device 808 comprises, for example, a magnetic disk and an optical disk.

In some embodiments, when executing the program instructions, the processor 802 is configured to perform the method described with reference to FIGS. 1 and 6, or as the system described with reference to FIGS. 2 to 5.

In some embodiments, the program instructions are stored in a non-transitory computer readable recording medium such as one or more optical disks, hard disks and non-volatile memory devices. In some embodiments, the table 404 shown in FIG. 4 and the tables 701 and 702 shown in FIG. 7 may be stored in files of a non-transitory computer-readable storage medium.

Embodiments of the present disclosure provide methods of power state coverage verification and power consumption estimation. The embodiments of the present disclosure provide a power state coverage metric and methods to estimate power state coverage based on the functional code coverage obtained through functional verification of the given IP. The embodiments of the present disclosure can check whether the ESL model has any missing power states and whether the power states defined in the ESL model are valid power states and cover most functional parts of the chip. The embodiments of the present disclosure can determine which of the power states in the ESL model are valid, how much functional coverage is associated with each power state, and the overall design coverage for all the power states in the ESL model.

In an embodiment, in a method for managing verification cases for a module in a chip design performed by at least one processor, an electronic system level (ESL) model comprising a plurality of blocks for the module is created. At least one ESL power state is defined for each of the plurality of blocks. At least one verification case is selected for each of the ESL power states. A target coverage value is set for each of the verification cases. Register transfer level (RTL) simulation is performed for each of the verification cases. An actual coverage value is received for each of the verification cases. The ESL power states and the verification cases are updated for each of the plurality of blocks.

In another embodiment, in a method for estimating a power state coverage of a block in an electronic system level (ESL) model performed by at least one processor, a first value, a second value, a third value and a block coverage value are set for the block. At least one verification case is selected for the block. For each of the at least one verification case: (a) a target coverage value is set, (b) register transfer level (RTL) simulation is performed, (c) an actual coverage value is received, (d) whether the actual coverage value is larger than or equal to the target coverage value is determined, and (e) the first value and the block coverage value is updated when the actual coverage value is larger than or equal to the target coverage value. Whether the block coverage value is larger than or equal to a predefined block coverage value is determined. The power state coverage is calculated for the block when the block coverage value is larger than or equal to the predefined block coverage value.

In still another embodiment, in a method for estimating an overall power state coverage of an electronic system level (ESL) model performed by at least one processor, a first value and a second value are set for each block. At least one verification case is selected for each block in the ESL model. For each of the at least one verification case: (a) a target coverage value is set, (b) register transfer level (RTL) simulation is performed, (c) an actual coverage value is received, and (d) the first value or the second value is updated based on whether the actual coverage value is less than the target coverage value or not. A power state coverage is calculated for each block. The overall power state coverage is calculated for the ESL model.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method performed by at least one processor for managing verification cases for a module in a chip design, the method comprising:
   creating an electronic system level (ESL) model comprising a plurality of blocks for the module;
   defining at least one ESL power state for each block of the plurality of blocks;
   selecting at least one verification case for each ESL power state of said at least one ESL power state;
   setting a target coverage value for each verification case of said at least one verification case;
   performing a register transfer level (RTL) simulation for said each verification case;
   receiving an actual coverage value for said each verification case; and
   updating the ESL power states and the verification cases for each block of said plurality of blocks.

2. The method of claim 1, wherein the updating the ESL power states and the verification cases for each block of the plurality of blocks includes updating the ESL power states and the verification cases for each block of the plurality of blocks based on the target coverage values and the actual coverage values.

3. The method of claim 1, wherein the updating the ESL power states and the verification cases for each block of the plurality of blocks includes adding or removing at least one verification case for at least one ESL power state of said ESL power states or adding or removing at least one ESL power state for at least one block of said plurality of blocks.

4. A method performed by at least one processor for estimating a power state coverage of a block in an electronic system level (ESL) model for a module in a chip design, the method comprising:
   setting a first value, a second value, a third value and a block coverage value for the block;
   selecting at least one verification case for the block;
   for each verification case of said at least one verification case:
   (a) setting a target coverage value;
   (b) performing a register transfer level (RTL) simulation;
   (c) receiving an actual coverage value;
   (d) determining whether the actual coverage value is larger than or equal to the target coverage value; and
   (e) updating the first value and the block coverage value when the actual coverage value is larger than or equal to the target coverage value;
   determining whether the block coverage value is larger than or equal to a predefined block coverage value; and
   calculating the power state coverage for the block when the block coverage value is larger than or equal to the predefined block coverage value.

5. The method of claim 4, further comprising:
   updating the second value when the actual coverage value is less than the target coverage value.

6. The method of claim 5, further comprising:
   adding at least one new verification case and updating the third value for the block when the block coverage value is less than the predefined block coverage value.

7. The method of claim 6, wherein the calculating the power state coverage for the block includes calculating the power state coverage for the block based on the first value, the second value, and the third value.

8. The method of claim 6, wherein the power state coverage for the block is calculated after adding the at least one new verification case for the block.

9. The method of claim 6, wherein updating the first value, the second value, or the third value includes adding a fixed or variable number to the first value, the second value, or the third value.

10. The method of claim 6, wherein the at least one new verification case is added based on the target coverage value associated with the at least one new verification case.

11. The method of claim 7, wherein the third value is modified by an impact factor.

12. The method of claim 4, wherein the block coverage value is updated based on the actual coverage value.

13. The method of claim 4, further comprising:
    adding a verification case of each of the at least one verification case to an exclusion list if the actual coverage value of the verification case is below a threshold.

14. The method of claim 13, wherein verification cases in the exclusion list are excluded from the calculation of the power state coverage for the block.

15. A method performed by at least one processor for estimating an overall power state coverage of an electronic system level (ESL) model comprising a plurality of blocks for a module in a chip design, the method comprising:
    setting a first value and a second value for each block;
    selecting at least one verification case for each block in the ESL model;
    for each verification case of said at least one verification case:
    (a) setting a target coverage value;
    (b) performing a register transfer level (RTL) simulation;
    (c) receiving an actual coverage value; and
    (d) updating the first value or the second value based on whether the actual coverage value is less than the target coverage value or not;
    calculating a power state coverage for each block; and
    calculating the overall power state coverage for the ESL model.

16. The method of claim 15, wherein the calculating a power state coverage for each block includes calculating the power state coverage for each block based on the first value and the second value.

17. The method of claim 15, wherein the calculating the overall power state coverage for the ESL model includes calculating the overall power state coverage for the ESL model based on the power state coverage of each block.

18. The method of claim 15, wherein the overall power state coverage for the ESL model is calculated based on the power state coverage and a weight value for each block.

19. The method of claim 15, further comprising:
updating the at least one verification case for each block in the ESL model based on the target coverage values and the actual coverage values.

20. The method of claim 19, further comprising:
re-calculating the power state coverage for each block and the overall power state coverage for the ESL model after updating the at least one verification case for each block in the ESL model.

* * * * *